HYBRID CIRCUITS

Filed Dec. 30, 1950 2 Sheets-Sheet 1

Inventor:
Eugene B Skolnikoff,
by Merton D Moore
His Attorney.

Oct. 27, 1953 E. B. SKOLNIKOFF 2,657,280

HYBRID CIRCUITS

Filed Dec. 30, 1950 2 Sheets-Sheet 2

Inventor:
Eugene B. Skolnikoff,
by Merton D. Morse
His Attorney.

Patented Oct. 27, 1953 2,657,280

UNITED STATES PATENT OFFICE 2,657,280

HYBRID CIRCUITS

Eugene B. Skolnikoff, Wembley, England, assignor to General Electric Company, a corporation of New York Application December 30, 1950, Serial No. 203,601

1 Claim. (Cl. 179—170)

The present invention relates in general to hybrid circuits and in particular relates to bi-directional communication systems of the kind used in carrier current communication over power lines, for instance.

In carrier current communication systems, a single telephone line carrying audio frequency signals in two directions is connected at one end of the system to the transmitter input and receiver output circuits of the radio frequency section of the system. The transmitter output and receiver input circuits are coupled to one end of a power line. At the other terminus of the power line, the same connections are made through another transmitter and receiver to another single telephone line. A loop is thus formed in the radio frequency section of the system from one end of the power line to the other along one radio frequency path, and back along the other radio frequency path. This loop will sustain oscillations due to the amplifiers in it which make the gain around the loop greater than one. Accordingly, a means must be provided which effectively isolates adjacent receivers and transmitters and yet accomplishes the necessary coupling to the telephone line.

Figure 1:
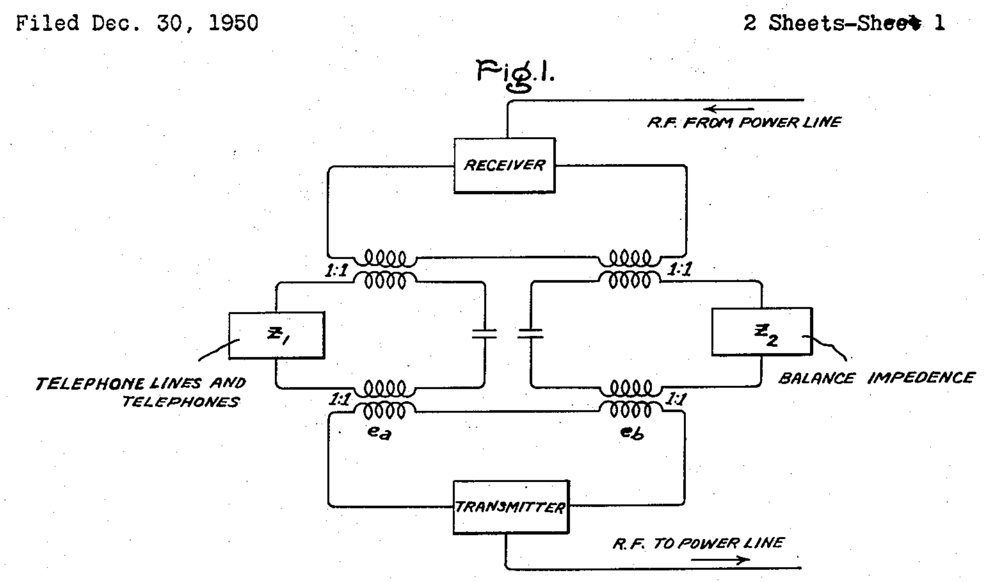

Presently, various balancing circuits commonly referred to as hybrids are used in the art to provide the functions of coupling and isolation aforementioned. These circuits include transformers and balancing impedances. One such circuit is shown in Fig. 1 of the drawing.

The performance of the balance circuit aforementioned depends complelety on how effectively the balance impedance used in these circuits can be matched to the impedance of the telephone line and associated circuits at all audio frequencies. Since telephone installations at each location of carrier current apparatus vary greatly with regard to the length of telephone lines used, and with regard to the numbers and types of telephones used, the impedance of each installation is usually different from every other installation. Accordingly, a compromise must be made in the balance impedance used at a particular frequency. Impedance balance circuits have proven to be workable in practice, but often they are not satisfactory because of the reasons among others mentioned above. Thus a need for an improved hybrid circuit to do away with these disadvantages and thereby allow better and more extensive communication networks is apparent.

The present invention is directed to new and improved hybrid circuits for achieving the above desired functions of isolation and coupling. The principle used in this new and improved hybrid circuit is a time sharing idea in which the two paths of a bi-directional system are alternately opened and closed so that only one path is completed at any instant. In this way the above-mentioned loop itself actually is never closed.

An object of the present invention is to provide an improved bi-directional communication system.

It is another object of the present invention to provide a means in a bi-directional communication system having a transmitter and receiver at each end connected to a single communication line whereby receiver signals are isolated from the transmitter and yet allowed to pass to the communication line.

It is a further object of the present invention to provide a bi-directional communication system having a signal rejection circuit which discriminates according to the direction of the applied signal.

A still further object of my invention is to provide an improved bi-directional communication system making use of constant resistance filters to obtain efficient and effective operation.

It is also an object of the present invention to provide an improved bilateral communication system in which the output waveform from the receiver section is used to key the transmitter section off during the passage of intelligence through the receiver section.

Figure 2:
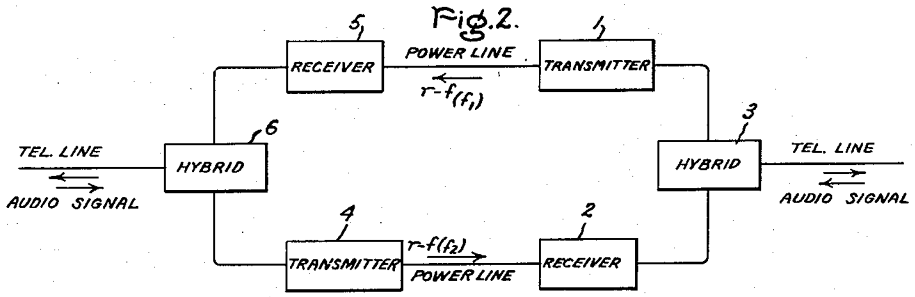
Figure 3:
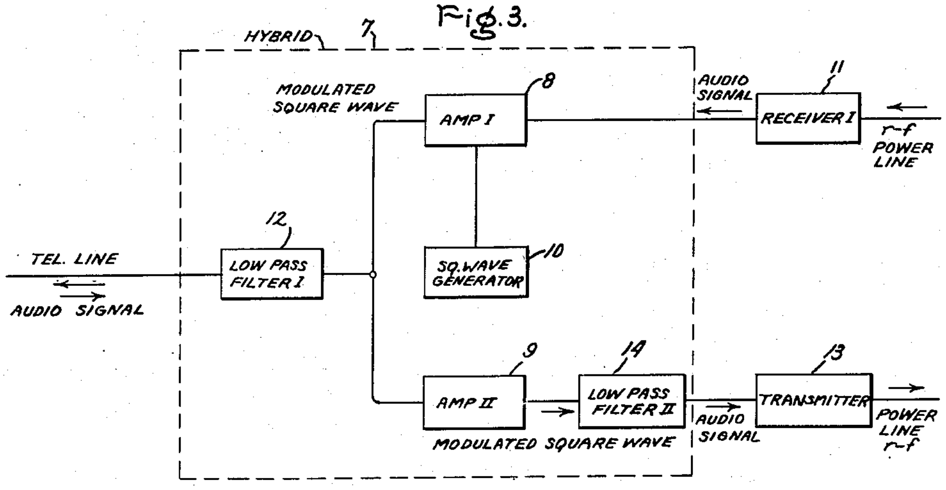
Figure 4:
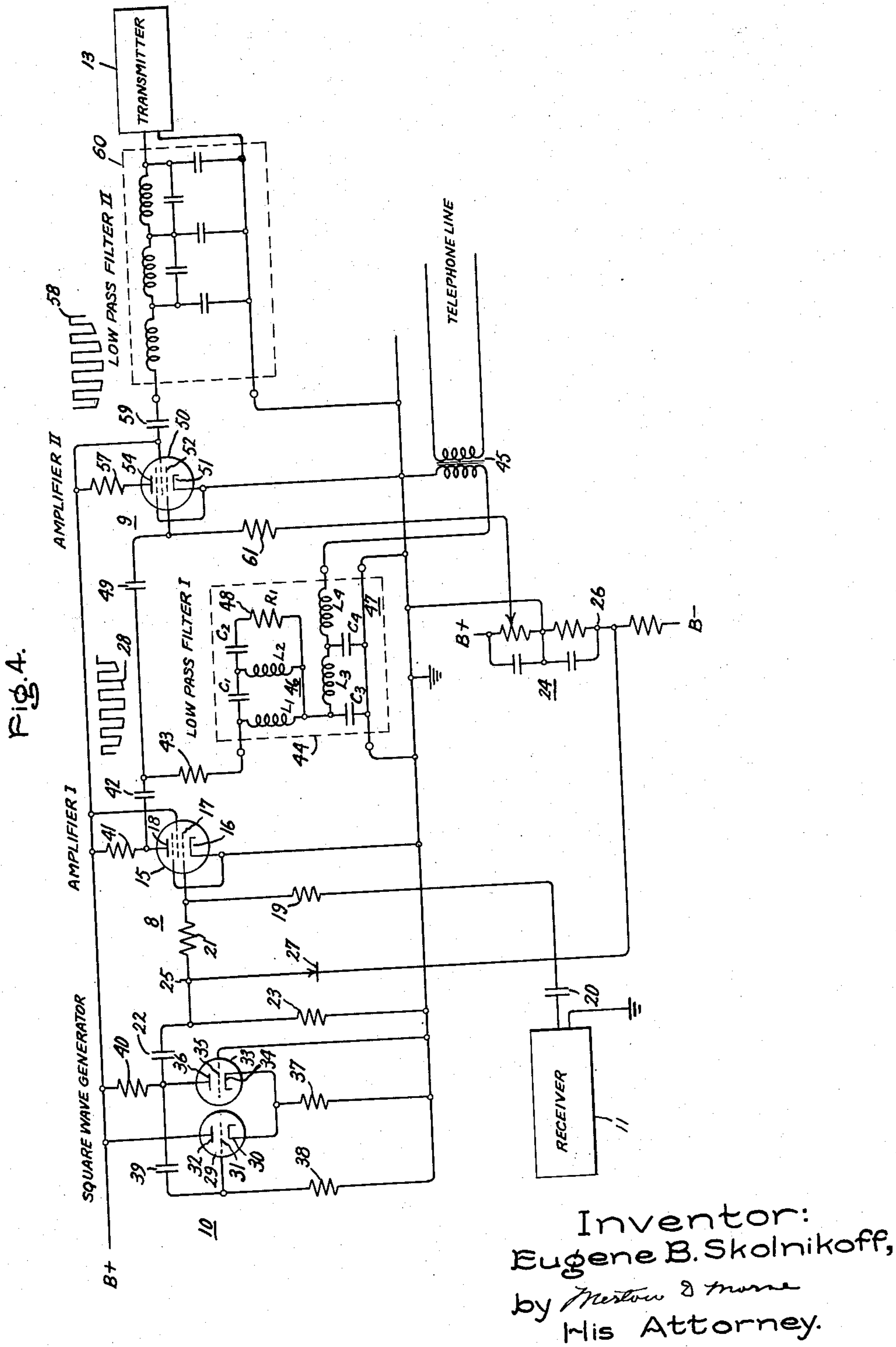

The novel features which I believe to be characteristic of my invention are set forth with particularity in the appended claim. My invention, however, both as to its organization and method of operation, together with further objects and advantages thereof may best be understood by reference to the following description taken in connection with the accompanying drawings in which Fig. 1 is a schematic representation of an impedance balancing circuit of the kind used in the prior art in bi-directional communication systems for achieving the functions of coupling and isolation; Fig. 2 is a block diagram of a carrier current system making use of hybrid circuits; Fig. 3 is a block diagram of an electronic hybrid circuit according to my invention; Fig. 4 is a schematic diagram of an embodiment of my invention.

Referring now to Fig. 1, there is shown a schematic diagram of a circuit of the impedance balance type for achieving the aforementioned functions of isolation and coupling in a bi-directional communication system. Impedance $Z_1$, the impedance of the telephone lines and telephones, is made equal to impedance $Z_2$, the balance impedance. Thus, the signal from the receiver will develop equal voltages $e_a$ and $e_b$ at the secondaries of the transmitter input transformers. The transformers are phased so that these voltages will be 180° out of phase thereby canceling each other. In this way none of the receiver output will reach the transmitter input.

The audio frequency output signal of the receiver will still reach the telephone line; however, half of its power will be lost in the balance impedance $Z_2$. Likewise, the audio frequency signal coming from the telephone line will reach the input of the transmitter, however, some of the input power also will be lost in the balance impedance $Z_2$. The hybrid circuit of Fig. 1 thus satisfies the requirement of being a coupling device as well as a means for isolation of the transmitter and receiver.

The impedance balance or hybrid circuit of Fig. 1 is used in a system such as is shown in Fig. 2. At one end of the system is located a transmitter 1 and a receiver 2. The input circuit of the transmitter 1 and the output circuit of the receiver 2 are connected to a hybrid circuit 3 which is in turn connected to a telephone line. At the other end of the system is located a transmitter 4 and a receiver 5. The input circuit of the transmitter 4 and the output circuit of the receiver 5 are connected to a hybrid circuit 6. The hybrid circuit 6 is in turn connected to a second telephone line. The input circuit of the receiver and the output circuit of the transmitter at each end of the system are coupled to a common power line. Preferably, the frequency of operation of each of the transmitters is different. It is readily seen that the hybrid circuit of Fig. 1 used in the system of Fig. 2 prevents a closed loop from being formed in the system and thereby producing detrimental oscillations in the loop comprising transmitter 1, receiver 2, transmitter 4 and receiver 5. At the same time, however, the hybrid circuit permits signals to pass from the receiver to the telephone line and from the telephone line to the transmitter at each end of the system.

In Fig. 3 is shown a block diagram of a circuit in accordance with my invention for performing the above referred to functions of coupling and isolation in a bi-directional communication system. The hybrid unit 7 is provided with a first amplifier 8 for incoming audio signals and a second amplifier 9 for outgoing audio signals. The amplifiers 8 and 9 are alternately keyed by a square wave generator 10 connected to the amplifier 8. Preferably, the keying is done at an ultrasonic rate in order to avoid any interference with the audio signals. A keying frequency of 20,000 cycles per second has been found quite satisfactory. The input circuit of the amplifier 8 is connected to the output circuit of the receiver 11. The input circuit of the receiver 11 in turn is connected to a power line. The output circuit of the first amplifier 8 and the input circuit of the second amplifier 9 are connected to a first pair of terminals of the low pass filter 12. The other pair of terminals of the low pass filter 12, in turn, is connected to a telephone line. The output circuit of the amplifier 9 is connected to a transmitter 13 through a second low pass filter 14. The output circuit of the transmitter 13 is connected to the aforementioned power line.

In operation, with no intelligence passing through the hybrid unit 7 in either direction square wave voltages are developed in the output circuits of amplifier 8 and amplifier 9. The amplifier 8 is keyed by generator 10 and the output waveform from amplifier 8 keys the input circuit of amplifier 9. The aforementioned waves are of opposite phase. Received signals applied to the input circuit of amplifier 8 cause a modulation of the negative peaks of the wave in the output circuit of the amplifier 8. The modulated square wave is applied to the filter 12 which removes the square wave components from the modulated wave and passes the received audio signal to the telephone line. The modulated square wave from the output of amplifier 8 does not pass through the amplifier 9 since the amplifier 9 is keyed off by the output waveform from amplifier 8 during the occurrence of the negative peaks of the output wave form.

Audio signals applied through the low pass filter 12 to the input circuit of amplifier 9 modulate the positive peaks of the square wave developed in the output circuit of amplifier 8. Thus, the negative peaks of the square wave developed in the output circuit of amplifier 9 are modulated. The square wave components of the modulated square wave are removed by the low pass filter 14 and the resultant audio signal is applied to the transmitter 13.

Referring now to Fig. 4, there is shown a schematic representation of circuits embodying my invention. Like reference numerals designate the corresponding elements of Fig. 3. The amplifier 8 comprises an electron discharge device 15 having a cathode 16, a grid 17 and an anode 18. The cathode 16 is connected to ground. The grid 17 is connected through a resistance 19 and a coupling capacitor 20 to the audio output terminal of the receiver 11. The grid 17 is also connected through a resistance 21 and a coupling capacitor 22 to the output circuit of the square wave generator 10. The load resistance 23 for the generator 10 is connected between the junction point 25 of the capacitor 22 and resistance 21 and ground. A unilaterally conducting device 27 is also connected from the junction point 25 to a source of bias potential 24 for the grid 17 of amplifier 8. Rectifier device 27 is poled so that when the junction point 25 tends to become more positive than the bias point 26, unilaterally conducting device 27 conducts and does not permit the potential of point 25 to rise above the potential of point 26. The resistors 19 and 21 are so proportioned that neither the source of square waves 10 nor the output circuit of the receiver is excessively loaded down, while at the same time, permitting the square wave signal and the audio signal to be applied simultaneously to the grid 17 of electron discharge device 15. The values of the elements used in the grid circuit of the electron discharge device 15 are not critical. However, the following values of these elements have been found quite suitable:

| | |
|---|---|
| Resistance 19 | 15,000 ohms |
| Resistance 21 | 22,000 ohms |
| Resistance 23 | 100,000 ohms |
| Capacitor 20 | 2 microfarads |
| Capacitor 22 | .0047 microfarad |

Unilaterally conducting device, crystal diode type 1N63.

Unilaterally conducting device 27 functions to maintain the bias potential of the grid 17 of electron discharge device 15 fixed and constant when electron discharge device 15 is rendered conductive by the positive portions of the square wave from the generator 10. It is during this interval that the audio signal from the receiver 11 is permitted to pass through the amplifier and modulate the negative peaks of the square wave output from device 15 as shown in the graph 28.

The square wave generator 10 which supplies the square wave keying signal to amplifier 8 may generally take a variety of forms well known in the art. The conventional cathode coupled multivibrator type of oscillation generator shown in the drawing comprising tubes 29 and 33 has been found quite satisfactory. Tube 29 is an electron discharge device comprising a cathode 30, a grid 31 and an anode 32. Tube 33 is an electron discharge device comprising a cathode 34, a grid 35 and an anode 36. The cathodes 30 and 34 are connected to one terminal of resistance 37, the other terminal of which is connected to ground. The grid 31 is connected to ground through a grid resistance 38 and to the anode 36 through capacitor 39. The anode 32 is connected to the positive terminal of a unidirectional source of potential. The grid 35 is connected to ground. The anode 36 is connected to the positive terminal of a source of unidirectional potential. In operation, a square wave of potential having a frequency determined in large part by the product of the magnitudes of resistor 38 and capacitor 39 is applied to the amplifier 8 through coupling capacitor 22 and resistance 21.

The anode 18 of the electron discharge device 15 is connected through a resistance 41 to the positive terminal of a source of unidirectional potential. The anode 18 is also connected through a capacitor 42 and a resistance 43 to one terminal of a first pair of terminals of filter 44, the other terminal is connected to ground. The second pair of terminals of the filter 44 is connected to the primary of a transformer 45, the secondary of which is connected to a telephone line.

The filter 44 comprises a high pass filter section 46 and a low pass filter section 47 having complementary cut-off characteristics. The first inductive element $L_1$ of the high pass filter section is connected in series with the first capacitive element $C_3$ of the low pass filter section between the aforementioned first pair of terminals of the filter. The high pass filter section is terminated in a suitable matching impedance 48, the corresponding end of the low pass filter section is connected to the second pair of terminals of the filter. By way of example, the following values of the elements of the filter have been found suitable for use with a telephone line presenting an impedance of about 500 ohms to the second pair of terminals of the filter:

| | |
|---|---|
| Inductance $L_1$ | 12.9 millihenries |
| Inductance $L_2$ | 17.5 millihenries |
| Inductance $L_3$ | 31.6 millihenries |
| Inductance $L_4$ | 7.16 millihenries |
| Resistance $R_1$ | 510 ohms |
| Capacitance $C_1$ | 0.05 microfarad |
| Capacitance $C_2$ | 0.221 microfarad |
| Capacitance $C_3$ | 0.123 microfarad |
| Capacitance $C_4$ | 0.0909 microfarad |

Since the high pass and low pass filter sections have complementary reactance characteristics the impedance presented at the first pair of terminals of the filter 44 is substantially pure resistance at all frequencies. Accordingly, the filter 44 does not distort the wave form of the voltage 28 appearing in the output circuit of the amplifier 8 and does not thereby deleteriously affect the operation of the hybrid circuit while at the same time the filter 44 permits the recovery of the audio component of the voltage 28 at the second pair of terminals of the filter 44. The output wave form 28 has positive peaks of uniform amplitude and negative peaks varying in accordance with audio signal from the receiver 11. The amplifier 9 is biased through resistance 61 so that tube 50 is cut off by the modulated negative peaks. However, an audio signal applied at the second pair of terminals of filter 44 is passed through the filter and modulates the positive peaks of the waveform 28 which is applied to amplifier 9 through the coupling capacitor 49.

The second amplifier 9 comprises an electron discharge device 50 having a cathode 51, a first control grid 52 and an anode 54. The cathode 51 is connected to ground and the grid 52 is connected through a capacitor 49 to the filter network 44 and also to the output circuit of the first amplifier 8. The grid 51 is also connected through an isolating resistance 61 to a source of grid bias 24. The anode 54 is connected through an anode resistance 57 to positive terminal of a source of unidirectional potential. Audio signals from the telephone line pass through the filter 44 and modulate the positive portions of the wave form 28 to develop in the anode circuit of the amplifier 9 a modulated square wave shown in graph 58 in which the negative portions are modulated in accordance with the audio signal from the telephone lines. The positive portions of the wave form 58 are unmodulated for the reason that the electron discharge device 50 is keyed off or rendered nonconductive by the negative peaks of wave form 28. The wave form 58 appearing at the anode 54 is applied through a coupling condensor 59 to one input terminal of the low pass filter 60, the other input terminal of which is connected to ground. The output of the low pass filter 60 is applied to the transmitter 13. The low pass filter removes the square wave components of the wave 58 permitting only the audio components to pass on to the transmitter. Accordingly it is apparent that in the circuit of Fig. 4 a signal from the output terminal of the receiver 11 is permitted to pass through the amplifier 8 and through the filter 44 to a telephone line while being prevented from passing to the amplifier 9 on to the transmitter 13. However, a signal originating at the telephone line is permitted to pass through the filter 44 in the other direction to the amplifier 9. From the amplifier 9 the signal is passed through a low pass filter 60 to the transmitter. Thus, it is seen that the circuit arrangement of Fig. 3 performs the desired functions of coupling and isolation of a hybrid without the disadvantages of the impedance balance system described above.

While I have shown a particular embodiment of my invention it will of course be understood that I do not wish to be limited thereto since many modifications, both in the circuit arrangement and in the instrumentalities employed may be made. I, therefore, contemplate by the appended claim to cover any such modifications as fall within the true spirit and scope of my invention.

What I claim as new and desire to secure by Letters Patent of the United States is:

In a communicating system, first and second communicating channels, first and second amplifiers each having an input circuit and an output circuit, first and second low pass filters each having two pairs of terminals, the output circuit of said second amplifier connected to a pair of terminals of said first low pass filter, the other pair of terminals of said first filter and the input circuit of said first amplifier connected to the same end of said first channel, the output circuit of said first amplifier and the input circuit of said second amplifier each connected to a first pair of terminals of said second filter, the other pair of terminals of said second filter being connected to said second channel, said second filter including a high pass filter section and a low pass filter section having complementary reactive characteristics and having the input ends thereof serially connected between said first pair of terminals, the load end of said high pass filter terminated in a suitable load impedance and the other end of said low pass filter section connected to the other pair of terminals of said second filter whereby audio signals are permitted to pass in either direction from one pair of terminals to the other pair of terminals and the first pair of terminals presents a substantially pure and fixed resistive impedance to the output circuit of said first amplifier with wide variations in the impedance at said other pair of terminals of said second filter, means for rendering said first amplifier conductive at a rate above the highest audio frequency of the signals desired to be passed through said channels, means responsive to the output of said first amplifier for rendering said second amplifier nonconductive during the conduction of said first amplifier, and conductive during the nonconduction of said first amplifier whereby said audio signals from said first channel are permitted to pass through said first amplifier and said second filter to said second channel and audio signals from said second channel are permitted to pass through said second filter, said second amplifier, and said first filter to said first channel, while signals from the output of said first amplifier are not permitted to pass through said second amplifier.

EUGENE B. SKOLNIKOFF.

References Cited in the file of this patent

UNITED STATES PATENTS

| Number | Name | Date |
|---|---|---|
| 1,568,891 | Espenshied | Jan. 5, 1926 |
| 1,742,902 | Deloraine et al. | Jan. 7, 1930 |
| 2,166,775 | Varley | July 18, 1939 |
| 2,366,011 | Donaldson | Dec. 26, 1944 |
| 2,542,807 | Fox et al. | Feb. 20, 1951 |
| 2,545,466 | Jeanlin | Mar. 20, 1951 |

FOREIGN PATENTS

| Number | Country | Date |
|---|---|---|
| 492,760 | Germany | Feb. 26, 1930 |
| 963,394 | France | July 6, 1950 |